US007643918B2

(12) United States Patent
Miyama et al.

(10) Patent No.: US 7,643,918 B2
(45) Date of Patent: Jan. 5, 2010

(54) CONTROL APPARATUS FOR A VEHICLE EQUIPMENT DEVICE

(75) Inventors: Syuji Miyama, Tokyo (JP); Kiichiro Ooyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 546 days.

(21) Appl. No.: 11/234,263

(22) Filed: Sep. 26, 2005

(65) Prior Publication Data
US 2006/0069479 A1  Mar. 30, 2006

(30) Foreign Application Priority Data
Sep. 28, 2004  (JP)  ............................. 2004-282332

(51) Int. Cl.
*H02M 5/00* (2006.01)
(52) U.S. Cl. ........................... 701/36; 361/90; 361/211; 361/626; 361/631
(58) Field of Classification Search ................. 701/36; 307/10.1, 31, 34, 43; 361/93.1, 90, 211, 361/217, 626, 631, 642, 643, 814; 340/652; 363/21.05; *H02M 5/00*
See application file for complete search history.

(56) References Cited

U.S. PATENT DOCUMENTS

| 5,596,497 | A | * | 1/1997 | Honda ......................... 701/45 |
| 5,848,659 | A | * | 12/1998 | Karg et al. .................. 180/65.4 |
| 6,114,775 | A | * | 9/2000 | Chung et al. ................ 307/10.1 |
| 6,630,749 | B1 | * | 10/2003 | Takagi et al. ................ 307/10.7 |
| 6,700,766 | B2 | * | 3/2004 | Sato ........................... 361/93.1 |
| 6,975,046 | B2 | * | 12/2005 | Sumimoto ..................... 307/9.1 |
| 7,212,892 | B2 | * | 5/2007 | Matsui et ..................... 701/31 |
| 7,274,223 | B2 | * | 9/2007 | Sakata et al. ................. 327/108 |
| 2002/0053037 | A1 | * | 5/2002 | Lee ............................. 713/300 |
| 2005/0099320 | A1 | * | 5/2005 | Nath et al. .................. 340/933 |
| 2005/0185352 | A1 | * | 8/2005 | Nguyen ....................... 361/90 |

FOREIGN PATENT DOCUMENTS

| JP | 9-49450 | 2/1997 |
| JP | 11-037025 | 2/1999 |

* cited by examiner

*Primary Examiner*—Tuan C To
(74) *Attorney, Agent, or Firm*—Smith, Gambrell & Russell, LLP

(57) ABSTRACT

There is disclosed an apparatus for controlling a vehicle equipment device. The apparatus permits a reduction in the cost of manufacturing a vehicle in which the apparatus is installed. The apparatus also enables easy and precise switching between normal mode and delivery mode. The apparatus has a delivery decision unit and control change unit. The decision unit makes a decision as to whether the vehicle is in the delivery mode. If the decision unit determines that the vehicle is in the delivery mode, the control change unit changes the controlled contents of the vehicle equipment device from normal mode to delivery mode. The decision unit makes the aforementioned decision according to whether a backup power supply is applied to a clock device.

11 Claims, 6 Drawing Sheets

CONTROL APPARATUS FOR A VEHICLE EQUIPMENT DEVICE

CROSS REFERENCE TO RELATED APPLICATION

The disclosure of Japanese Application No. 2004-282332 filed on Sep. 28, 2004, including the specification, drawings and abstract, is incorporated herein by reference in its entirety.

FIELD OF THE INVENTION

The present invention relates to a control apparatus for a vehicle equipment device, preferably the control apparatus which is used in a vehicle, varies the controlled contents of the vehicle equipment device from normal mode to delivery mode when the vehicle is put in a delivery mode.

BACKGROUND OF THE INVENTION

When an automotive vehicle undergoes an inspection during assembly in a manufacturing plant or is made to run without external assistance during transportation from the plant to an automotive store after completion of the assembly, the engine and other devices are started and stopped. At this time, with respect to the engine, there is the problem that the engine comes to a stop before the temperature of the spark plug reaches its self-cleaning temperature, because the time period from start to stop is much shorter than during normal usage. Another problem is that if the vehicle is controlled in a normal manner, it follows that the vehicle comes to a stop during a warm-up operation in which the air-fuel ratio is relatively rich so that the plug tends to smolder. In addition, where the fuel loaded within the plant is different from a destination-matched fuel, knocking may take place, because the engine control corresponds to the destination.

It is known that when a vehicle runs without external assistance for inspection or transportation for delivery from a plant, the controlled contents of the engine are placed in delivery mode different from normal mode, in order to solve the problems. That is, the problems are solved either by making the air-fuel ratio leaner than normal or by retarding the ignition timing by controlling the engine. In this way, a vehicle equipment device such as an engine is switched between normal mode and delivery mode adapted for transportation by a control apparatus such as an ECU (electrical control unit)

In a well-known technique for switching the operation for engine control between normal mode and delivery mode by an ECU, the switching operation is performed by engagement and disengagement of a dedicated connector (for example, see Japanese Patent Laid Open Japanese Patent Laid-Open No. 11-37025). According to this technique, the dedicated connector and harness are mounted. When the connector is connected, it is judged that the vehicle is in the delivery mode. When the connector is disconnected, it is judged that the vehicle is not in the delivery mode.

In the above-described control apparatus, however, the connector and harness are mounted to judge the delivery mode. This increases the number of components, presenting the problem that the cost of manufacturing the vehicle is increased. In addition, in an automotive store, an operation for disconnecting the connector is required, i.e., a cumbersome operation is needed. Further, in a store, if the staff forgets to disconnect the connector or the user erroneously connects the connector, the user will use the vehicle while kept in the delivery mode.

SUMMARY OF THE INVENTION

In view of the foregoing circumstances, the present invention has been made. It is an object of the invention to provide a control apparatus for a vehicle equipment device which can reduce the cost of manufacturing a vehicle and which can easily and precisely switch the mode of operation between normal mode and delivery mode.

A first aspect of the present invention which achieves the foregoing object provides a control apparatus for a vehicle equipment device, the control apparatus having delivery decision means for making a decision as to whether a vehicle is in a delivery mode or not and control change means for changing controlled contents of the vehicle equipment device from normal mode to delivery mode if the decision made by the delivery decision means is that the vehicle is in the delivery mode. The delivery decision means makes the aforementioned decision according to whether a backup power supply is applied to an in-vehicle electronic device.

According to the first aspect of the invention, the in-vehicle electronic device is connected with the backup power supply and constantly supplied with electric power. However, during assembly in a plant or during transportation from the plant to an automotive store after the assembly, the vehicle is not in use for a long time. In this case, the harness connector, for example, is disconnected to electrically disconnect the backup power supply and the in-vehicle electronic device, for preventing the battery from dying.

A decision is made as to whether the vehicle is in the delivery mode, depending on whether the backup power supply is applied to the in-vehicle electronic device. Therefore, the state in which the vehicle is not in use for a long time can be precisely judged as being in the delivery mode. If the delivery decision means determines that the vehicle is in the delivery mode, the control change means changes the controlled contents of the vehicle equipment device to the delivery mode adapted for short-term use of the vehicle.

Therefore, a separate connector or harness for judging whether the vehicle is in the delivery mode is dispensed with, unlike in the prior art. The number of components is reduced. The cost of manufacturing the vehicle can be reduced. Furthermore, a decision is made as to whether the vehicle is in the delivery mode or not, depending on whether the backup power supply is applied to the in-vehicle electronic device. Therefore, switching between normal mode and delivery mode can be done easily and precisely.

A second aspect of the present invention provides a control apparatus for a vehicle equipment device, the control apparatus having delivery decision means for making a decision as to whether a vehicle is in a delivery mode or not and control change means for changing controlled contents of a previously selected in-vehicle device from normal mode to the delivery mode if the decision made by the delivery decision means is that the vehicle is in the delivery mode. The control apparatus is supplied with electric power from a backup power supply. The delivery decision means makes the decision depending on whether the backup power supply is applied or not.

According to the second aspect of the invention, the apparatus is designed to be connected with the backup power supply and constantly supplied with electric power. However, during assembly in a plant or during transportation from the plant to an automotive store after the assembly, the vehicle is not in use for a long time. In this case, the harness connector, for example, is disconnected to electrically disconnect the backup power supply and the apparatus, thus preventing the battery from dying.

A decision is made as to whether the vehicle is in the delivery mode or not, depending on whether the backup power supply is applied or not. Therefore, the state in which the vehicle is not in use for a long time can be precisely judged as the delivery mode. If the decision made by the delivery decision means is that the vehicle is in the delivery mode, the control change means changes the controlled contents of the vehicle equipment device to the delivery mode adapted for short-term use of the vehicle.

In addition, the apparatus should be designed to directly detect whether the backup power supply is applied to the apparatus itself. This makes it unnecessary to send information about the backup power supply from the outside. Hence, the harness, connectors, and so on connected with the apparatus can be simplified.

A control apparatus for a vehicle equipment device according to a third aspect of the present invention is based on a control apparatus for a vehicle equipment device according to the first aspect of the invention and further characterized in that the in-vehicle electronic device pertains to functions independent of the driving related functions of the vehicle.

According to the third aspect of the invention, the advantages of the first aspect are obtained. In addition, the in-vehicle electronic device used to make a decision as to whether the vehicle is in the delivery mode or not is independent of the driving related functions of the vehicle. Therefore, although the backup power supply is not supplied in the delivery mode, operations related to the driving functions such as of motors, transmission, various gears, and suspension are not hindered. Consequently, when the vehicle is judged to be in the delivery mode, it is assured that inspection of the power system within a manufacturing plant, movement of the vehicle without external assistance within the plant after the completion of the assembly, and movement of the vehicle without external assistance during transportation of the vehicle are carried out.

A control apparatus for a vehicle equipment device according to a fourth aspect of the present invention is based on a device control apparatus for a vehicle equipment device according to the first of the invention and further characterized in that the delivery decision means makes the decision as to whether the backup power supply is applied or not, depending on whether a fuse disposed in a circuit for the backup power supply has been inserted or withdrawn.

According to the fourth aspect of the invention, the advantages of the first aspect are obtained. In addition, the backup power supply and the in-vehicle electronic device are electrically connected or disconnected by insertion or withdrawal of the fuse. Therefore, it is possible to make a reliable decision as to whether the backup power supply is applied or not. Consequently, the application of the backup power supply can be grasped without providing any separate connector. This leads to a further decrease in the manufacturing cost. Furthermore, if the circuit of the backup power supply is constructed using a fuse box equipped in the vehicle, the manufacturing cost can be reduced effectively.

A control apparatus for a vehicle equipment device according to a fifth aspect of the present invention is based on a device control apparatus for a vehicle equipment device according to the fourth aspect and further characterized in that there is further provided a storage circuit for receiving and holding the fuse withdrawn from the circuit of the backup power supply and that the delivery decision means detects the fuse in the storage circuit to thereby judge whether the fuse has been inserted in the circuit of the backup power supply or withdrawn from the circuit.

According to the fifth aspect of the invention, the advantages of the fourth aspect are obtained. In addition, the fuse in storage is detected with the storage circuit. Therefore, a reliable decision can be made as to whether the fuse has been withdrawn from the circuit of the backup power supply. Furthermore, if the fuse has broken simply, the fuse can be prevented from being misrecognized as having been withdrawn; otherwise, the vehicle would shift to the delivery mode.

A control apparatus for a vehicle equipment device according to a sixth aspect of the present invention is based on a control apparatus for a vehicle equipment device according to the first or second aspect of the invention and further characterized in that there is further provided communication means for receiving an instruction signal regarding control of the vehicle equipment device from the outside and that the control change means changes the controlled contents of the vehicle equipment device based on the instruction signal received by the communication means.

According to the sixth aspect of the invention, the advantages of the first or second aspect of the invention are obtained. In addition, the controlled contents are changed based on the instruction signal received by the communication means. Thus, the controlled contents of the selected in-vehicle device can be changed finely according to a work or purpose.

A control apparatus for a vehicle equipment device according to a seventh aspect of the present invention is based on a control apparatus for a vehicle equipment device according to the sixth aspect and further characterized in that the control change means receives an instruction signal by means of the communication means. If the delivery decision means determines that the vehicle is in the delivery mode, the control change means changes the controlled contents of the vehicle equipment device to the delivery mode.

According to the seventh aspect of the invention, the advantages of the sixth aspect are obtained. In addition, the delivery decision means makes a decision. Furthermore, the controlled contents of the vehicle equipment device are changed to the delivery mode provided that an instruction signal is received by the communication means. That is, the controlled contents are not shifted to the delivery mode unless an instruction signal is received by the communication means. Therefore, shifting to the delivery mode due to a malfunction under normal operating conditions of the vehicle can be certainly prevented.

A control apparatus for a vehicle equipment device according to an eighth aspect of the present invention is based on a control apparatus for a vehicle equipment device according to the sixth aspect and further characterized in that, if the communication means receives an instruction signal and the delivery decision means determines that the vehicle is not in the delivery mode, the control change means changes the controlled contents of the vehicle equipment device to an inspection mode.

According to the eighth aspect of the invention, the advantages of the sixth aspect are obtained. In addition, the controlled contents of the vehicle equipment device are changed to at least three modes including delivery mode, inspection mode, and normal mode by the control change means. The controlled contents are changed to the inspection mode provided that an instruction signal is received by the communication means and the delivery decision means determines that the vehicle is not in the delivery mode. The controlled contents are changed to the delivery mode provided that the delivery decision means determines that the vehicle is in the delivery mode irrespective of whether any instruction signal is received by the communication means. The normal mode is maintained provided that the delivery decision means determines that the vehicle is not in the delivery mode and that no instruction signal is received by the communication means.

In this way, the selected in-vehicle device can be placed in the inspection mode. For example, when the vehicle is transported for a long time to an automotive store after delivery from a plant, the vehicle is placed in the delivery mode. During inspection performed in the store, the vehicle is placed in the inspection mode. In this manner, when the vehicle is inspected, the controlled contents are made different from the contents used in the delivery mode. Control can be performed according to the contents of the work to inspect the vehicle.

A control apparatus for a vehicle equipment device according to a ninth aspect of the present invention is based on the sixth aspect and further characterized in that the control change means is so designed that controlled contents in the delivery mode when the communication means has received an instruction signal and the delivery decision means has determined that the vehicle is in the delivery mode are made different from controlled contents in the delivery mode when the communication means has received no instruction signal and the delivery decision means has determined that the vehicle is in the delivery mode.

According to the ninth aspect of the invention, the advantages of the sixth aspect of the invention are obtained. In addition, the controlled contents in the delivery mode are made different according to whether an instruction signal has been received by the communication means. By making the controlled contents in the delivery mode different in this way, the controlled contents when a delivery inspection is performed in a plant are made different from the controlled contents when the vehicle is transported to an automotive store after delivery from the plant. The controlled contents when a delivery inspection of the vehicle is performed are made different from the controlled contents during transportation. In consequence, control can be performed according to the contents of a work to perform the delivery inspection of the vehicle.

In this way, according to the present invention, the cost of manufacturing a vehicle is reduced. In addition, switching between normal mode and delivery mode can be done easily and precisely.

DETAILED DESCRIPTION OF THE PRESENT INVENTION

Figure 1:
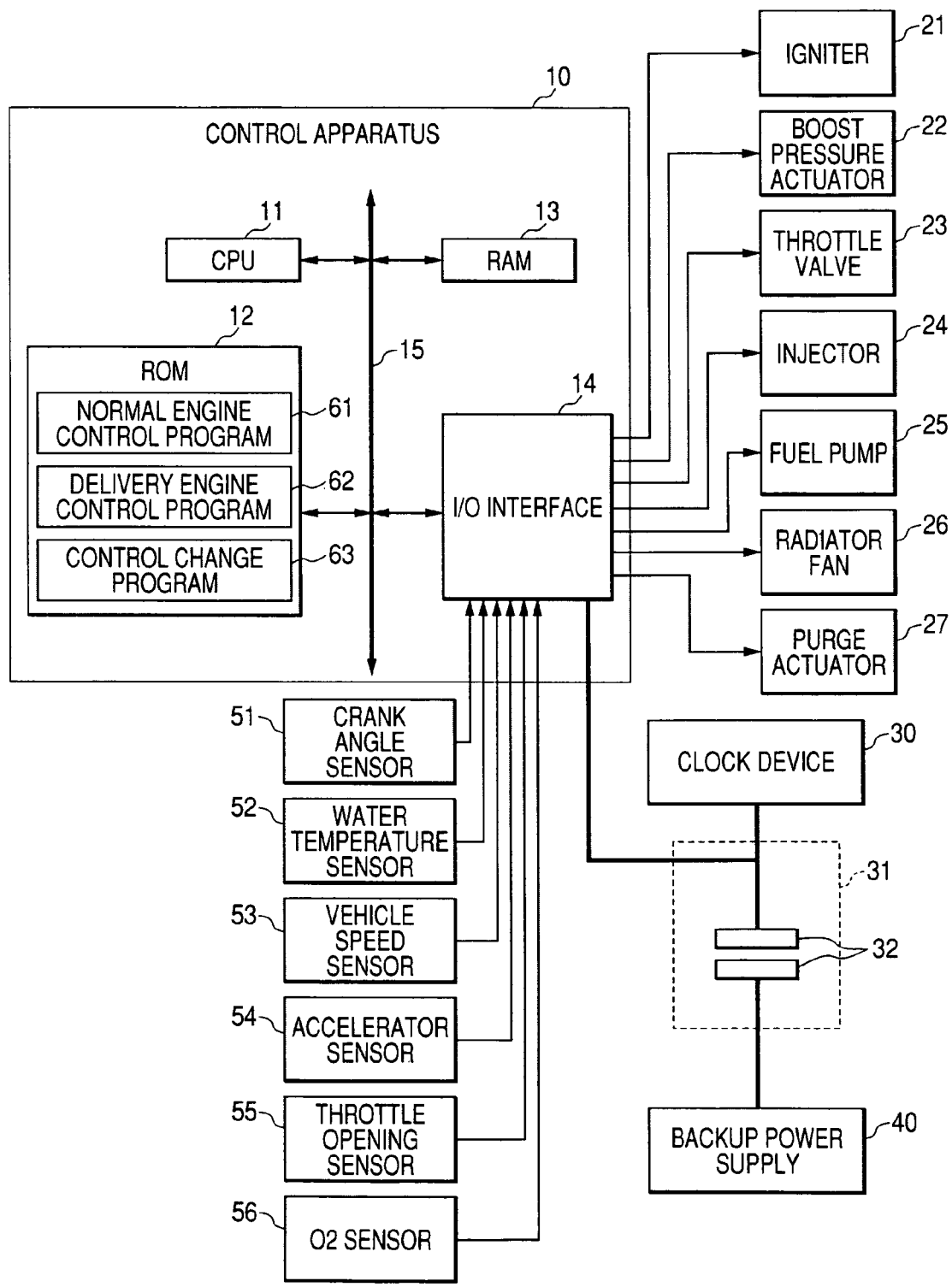
FIG. 1 is a schematic block diagram of a control apparatus showing a first embodiment of the present invention.

FIG. 1 is a schematic block diagram of a control apparatus showing one embodiment of the present invention.

As shown in FIG. 1, the control apparatus, 10, is connected with various devices including an igniter 21 for the engine, a boost pressure actuator 22 for adjusting the pressure in the supercharger of the engine, a throttle valve 23 for adjusting the amount of air drawn into the engine, an injector 24 for adjusting the amount of injected fuel, a fuel pump 25 for adjusting the amount of delivered fuel, a radiator fan 26 for adjusting the amount of air circulating through the radiator, and a purge actuator 27 for adjusting purging of the fuel in a canister. This control apparatus 10 controls the state of operation of the engine that is a vehicle equipment device, and is generally known as an ECU. The control apparatus 10 for the vehicle equipment device is connected with a backup power-supply circuit 31 for a clock device 30 installed in the vehicle. The clock device 30 purely relates to the functions of a timepiece and is independent of the running related functions of the vehicle.

The backup power-supply circuit 31 is used to maintain the clock function connected with the vehicle power supply. The power-supply circuit 31 is different from an accessory power-supply circuit for supplying electric power to various devices and appliances when the key cylinder of the vehicle key is rotated, an ignition power-supply circuit, and a lighting power-supply circuit for supplying electric power to the lights of various display portions when lighting switches are manipulated. The backup power-supply circuit 31 connects a backup power supply 40 and the clock device 30 via a pair of detachable clock power-supply connectors 32.

In this way, the clock device 30 is designed to be connected with the backup power supply 40 and constantly supplied with electric power. However, where the vehicle is not in use for a long time such as when the vehicle is assembled in a plant or when the vehicle is being transported from the plant to a store after the assembly, the clock power-supply connectors 32 are disconnected to break the electrical connection with the backup power supply 40 to prevent the battery from dying.

The control apparatus 10 for the vehicle equipment device has a CPU 11, a ROM 12, a RAM 13, and an I/O interface 14 all of which are connected with a bus 15. The I/O interface 14 is connected with a crank angle sensor 51, a water temperature sensor 52, a vehicle speed sensor 53, an accelerator sensor 54, a throttle opening sensor 55, an $O_2$ sensor 56, and so on. The interface 14 is also connected with the igniter 21, boost pressure actuator 22, throttle valve 23, injector 24, fuel pump 25, radiator fan 26, backup power-supply circuit 31, and other components. A normal engine control program 61 for controlling the engine in normal mode is stored in the ROM 12. Based on information detected by the sensors 51-56, the igniter 21, boost pressure actuator 22, throttle valve 23, injector 24, fuel pump 25, radiator fan 26, purge actuator 27, and other components are controlled.

Furthermore, a delivery engine control program 62 for controlling the engine in delivery mode and a control change program 63 for changing the controlled contents of the engine from normal mode to delivery mode according to whether the backup power supply 40 is applied to the clock device 30 are stored in the ROM 12. In the present embodiment, the ROM 12 in which the control change program 63 is stored, the CPU 11, constitute delivery decision means for making a decision as to whether the vehicle is in the delivery mode according to whether the back up power supply 40 is applied to the clock device 30. These components also constitute control change means for changing the controlled contents of the engine if the delivery decision means determines that the vehicle is in the delivery mode.

The delivery engine control program 62 performs a lean operation in which the air-fuel ratio is made leaner than in normal operation. The control program 62 also performs a retard operation in which the ignition timing is retarded compared with normal operation. The lean operation prevents the spark plug from smoldering. The retard operation prevents knocking. In particular, the lean operation is achieved by setting a table independent of a table used for normal operation and using the former table in the delivery mode. The table for the lean operation uniquely determines an amount of injected fuel from the engine rotational speed and the water temperature detected by the water temperature sensor 52. The engine rotational speed is calculated based on a signal from the crank angle sensor 51.

Furthermore, in the present embodiment, the delivery engine control program 62 performs a low-pressure operation in which the boost pressure into the engine is made lower than in normal operation. In particular, if the boost pressure is increased, the air-fuel ratio is made richer to suppress increase of the exhaust temperature. However, the boost pressure is lower than in normal operation and consequently the air-fuel ratio does not become rich. This prevents smoldering of the spark plug.

In addition, the delivery engine control program 62 performs a limiter-decreased operation and an opening limiter operation in which the throttle opening is prevented from increasing beyond a given opening differently from in the normal operation. In the limiter-decreased operation, the state of a new vehicle in which the engine has not yet been sufficiently tuned is assumed and the rotational frequency of a rotation limiter at which the fuel is cut off is made lower than in normal operation.

Further, the delivery engine control program 62 performs control of the fan such that the radiator fan 26 is operated even at low temperatures. Thus, in normal operation, the radiator fan 26 does not operate unless the water temperature of the engine-cooling water exceeds a given temperature. On the other hand, in this operation, the radiator fan 26 is operated regardless of the water temperature. Hence, operation of the radiator fan 26 can be checked.

The control change program 63 switches the controlled contents of the engine according to the input from the backup power-supply circuit 31. That is, where the clock power-supply connectors 32 are connected together and the backup power supply 40 is applied to the clock device 30, the controlled contents of the engine are kept in the normal mode. This decision as to whether the vehicle is in the delivery state or not is made steadily, e.g., every 10 ms. If the clock power-supply connectors 32 are disconnected and application of the backup power supply 40 to the clock device 30 cannot be checked, the controlled contents of the engine are changed to the delivery mode.

According to the control apparatus 10 constructed in this way, a decision is made as to whether the vehicle is in the delivery mode or not depending on whether the backup power supply 40 is applied to the clock device 30. Therefore, the state in which the vehicle is not in use for a long time can be precisely judged as the delivery mode. Furthermore, if this judgment is made, the controlled contents of the engine are changed to the delivery mode adapted for short-term use of the vehicle.

Therefore, a separate connector or harness for making a decision as to whether the vehicle is in the delivery mode is not necessary, unlike in the prior art. The number of components is reduced and thus the cost of manufacturing the vehicle can be decreased. Furthermore, a decision is made as to whether the vehicle is in the delivery mode or not depending on whether the backup power supply 40 is applied to the clock device 30. Consequently, switching between normal mode and delivery mode can be easily and precisely done.

Furthermore, according to the control apparatus 10 of the present embodiment, the clock device 30 used to make a decision as to whether the vehicle is in the delivery mode or not is independent of the running related functions of the vehicle and so if no electric power is supplied from the backup power supply 40 in the delivery mode, operations related to the running functions such as of engine, transmission, various gears, and suspension are not hindered. Consequently, if the vehicle is judged to be in the delivery mode, inspection of the power system within a plant, movement of the vehicle without external assistance within the plant after the assembly, and movement of the vehicle without external assistance during transportation of the vehicle can be done precisely.

Figure 2:
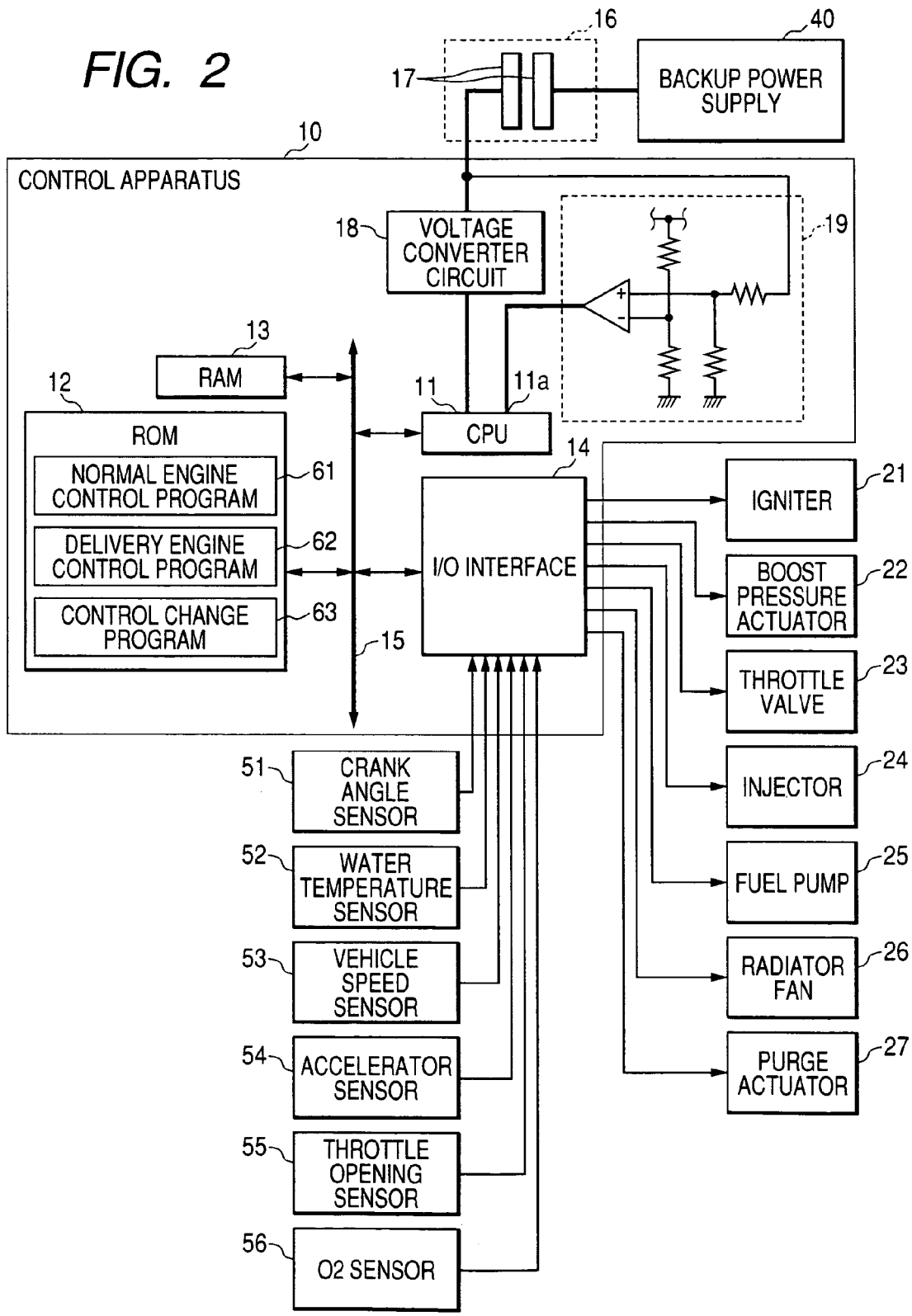
FIG. 2 is a schematic block diagram of a control apparatus showing a modified embodiment.

In the above embodiment, a decision is made as to whether the vehicle is in the delivery mode or not according to whether the backup power supply 40 is applied to the clock device 30. As shown in FIG. 2, a decision may be made as to whether the vehicle is in the delivery mode or not according to whether a voltage from the backup power supply 40 is applied to the control apparatus 10 itself. In this case, it is necessary to design the apparatus such that the running of the vehicle is not hindered if no electric power is supplied to the control apparatus 10.

Figure 3:
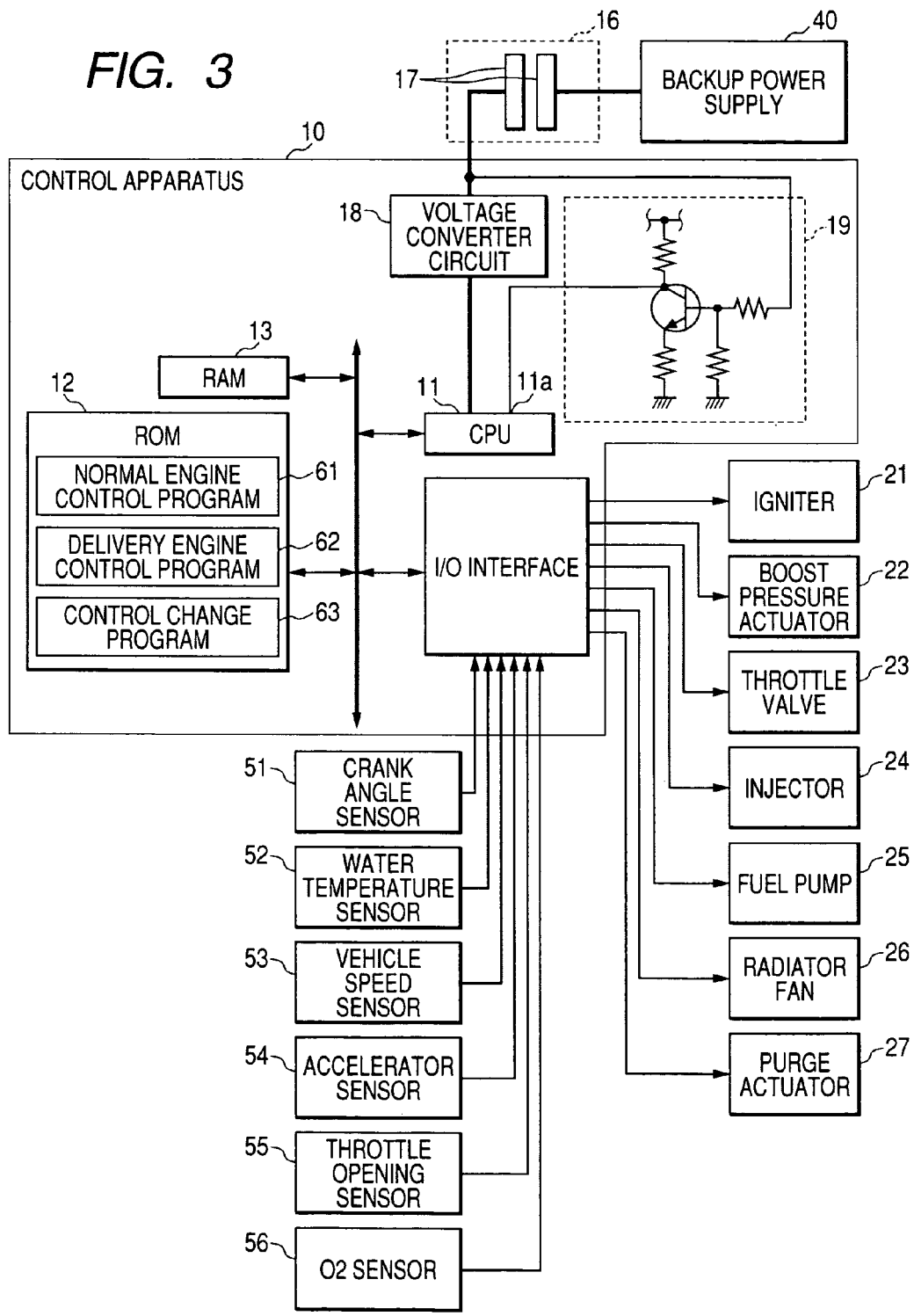
FIG. 3 is a schematic block diagram of a control apparatus showing another modified embodiment.

In the control apparatus 10 shown in FIG. 2, a pair of detachable apparatus power-supply connectors 17 is mounted to the backup power-supply circuit 16 of the apparatus 10. Although no description is given in the above embodiment, the control apparatus 10 has a voltage converter circuit 18 for converting the voltage of 12 V of the vehicle backup power supply 40 into 5 V corresponding to the specification of the CPU 11 as shown in FIG. 2. The CPU 11 has a decision port 11a that is connected with the voltage converter circuit 18 and with the backup power-supply circuit 16 inside the apparatus 10 by a connector circuit 19 having an operational amplifier. In this case, the state of application of the backup power supply 40 is detected, depending on whether the voltage detected at the decision port 11a is at high or low level. The connector circuit 19 may also be constructed using transistors instead of the operational amplifier as shown in FIG. 3.

In this case, the same advantages as the above embodiments are produced, as a matter of course. Since it is only necessary to directly detect whether the backup power supply 40 is applied to the apparatus itself, it is not necessary to send information regarding the application of the voltage from the backup power supply 40 from the outside to the apparatus 10. The harness, connectors, and so on connected with the control apparatus 10 can be simplified. Accordingly, the manufacturing cost can be reduced further.

Figure 4:
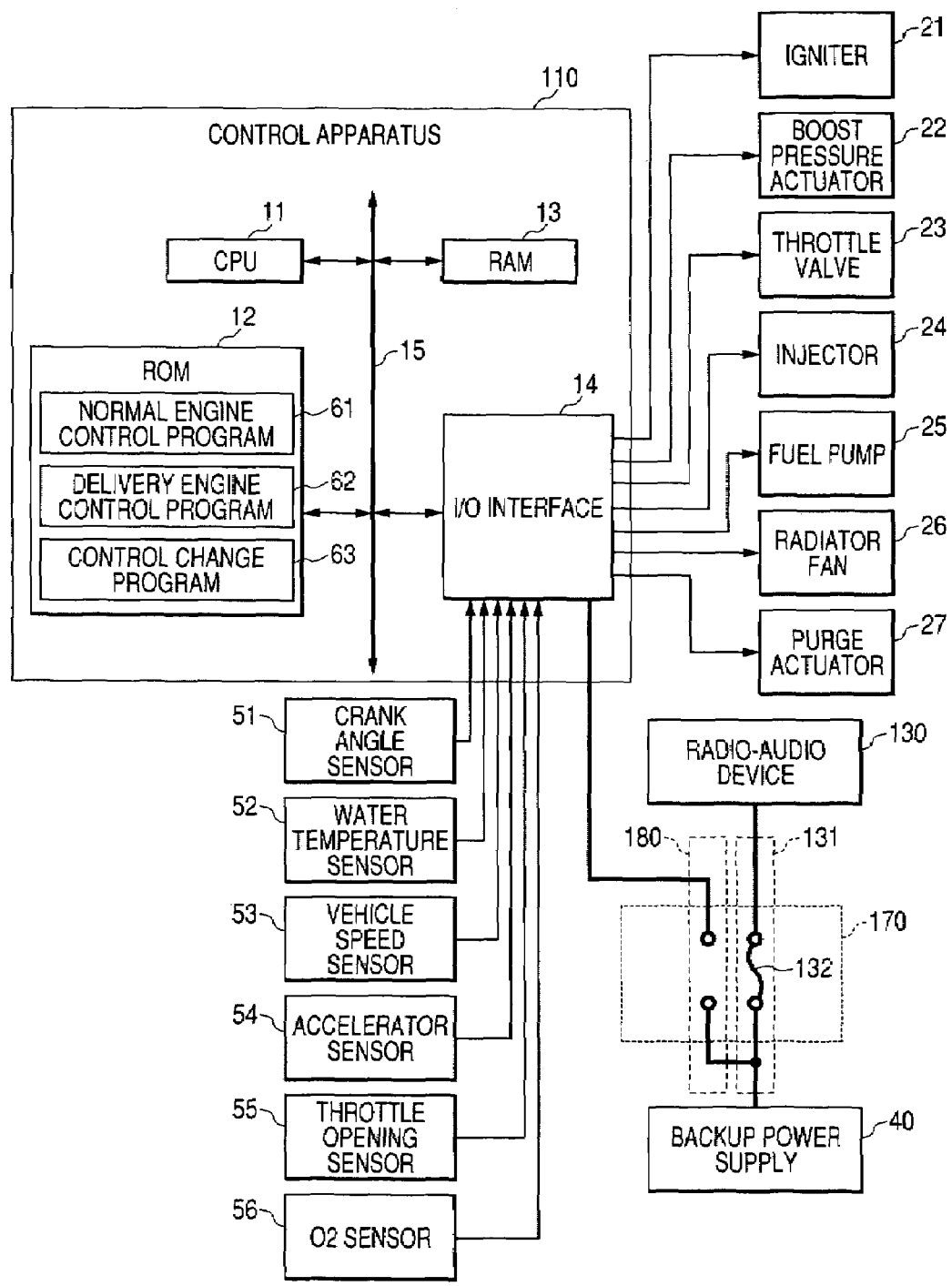
FIG. 4 is a schematic block diagram of a control apparatus showing a second embodiment of the invention.
Figure 5:
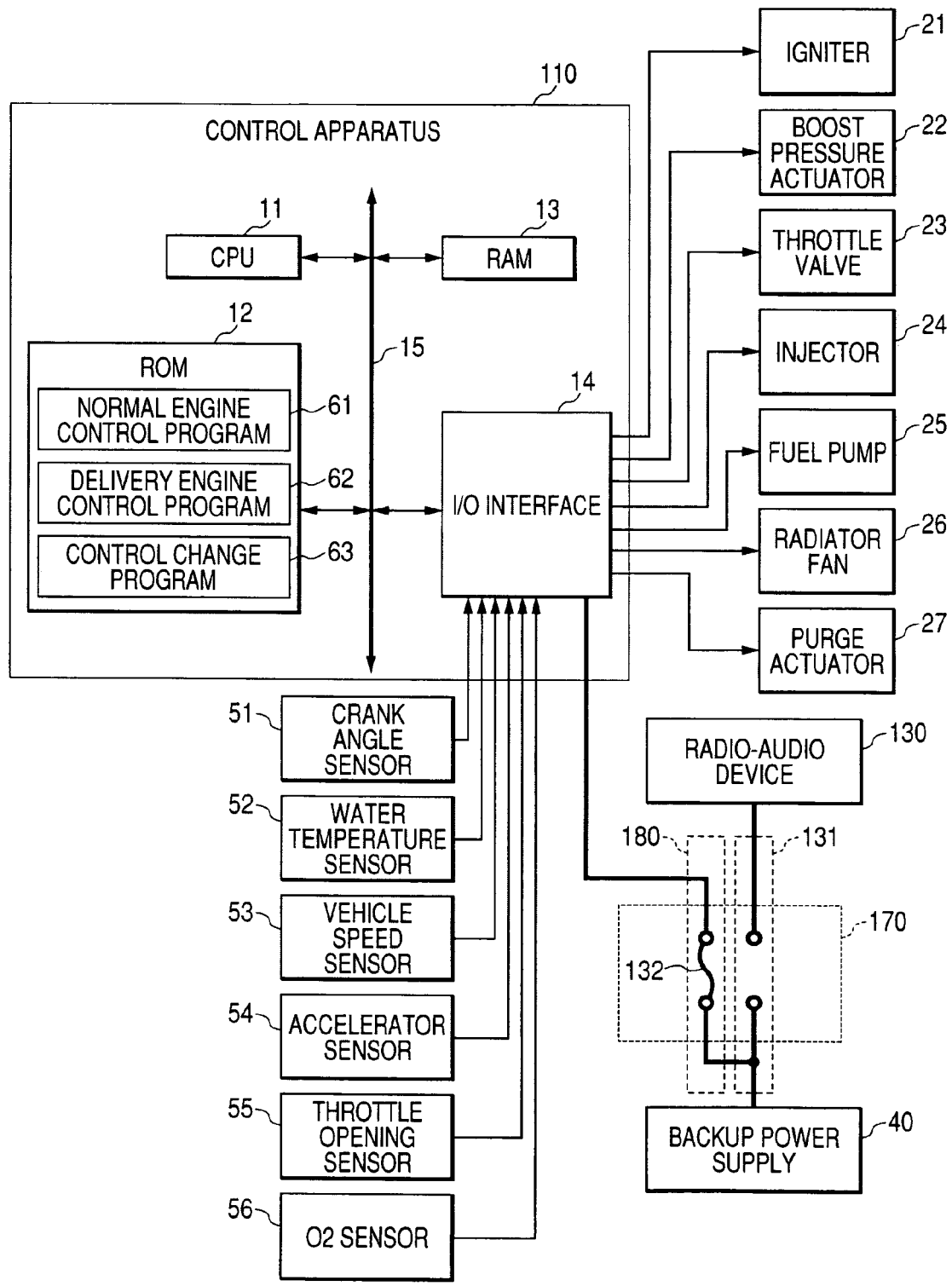
FIG. 5 is a schematic block diagram of a control apparatus, and in which a fuse is held in a storage circuit.

FIGS. 4 and 5 show a second embodiment of the present invention. FIG. 4 is a schematic block diagram of a control apparatus for a vehicle equipment device. FIG. 5 is a schematic block diagram of the control apparatus for a vehicle equipment device, and in which a fuse has been held in a storage circuit.

As shown in FIG. 4, a control apparatus 110 of the second embodiment is similar in configuration with the control apparatus 10 of the first embodiment except that a decision is made as to whether the vehicle is in the delivery mode or not according to whether the backup power supply 40 is applied to a radio-audio device 130 rather than to the clock device 30 and that a decision is made as to whether the vehicle is in the delivery mode or not depending on whether a fuse 132 disposed in a backup power-supply circuit 131 has been inserted or withdrawn. The following description centers on the differences with the first embodiment.

The radio-audio device 130 relates purely to the functions of a radio receiver and is independent of the running related functions of the vehicle. Furthermore, as shown in FIG. 4, the backup power-supply circuit 131 connects the radio-audio device 130 and backup power supply 40 via the fuse 132. The fuse 132 is accommodated in a fuse box 170 fitted in the vehicle.

In the present embodiment, the control apparatus 110 for the vehicle equipment device has a storage circuit 180 for receiving and holding the fuse 132 withdrawn from the backup power-supply circuit 131. The storage circuit 180 is also designed to receive and hold the fuse 132 by the fuse box 170. As shown in FIG. 5, the storage circuit 180 is located between the backup power supply 40 and I/O interface 14 and electrically connects the backup power supply 40 and I/O interface 14 by accepting the fuse 132.

The control change program 163 detects the fuse 132 by means of the storage circuit 180. Thus, the program judges whether the fuse 132 has been inserted in the backup power-supply circuit 131 or withdrawn from it. The program then judges whether the backup power supply 40 is applied to the radio-audio device 130 according to whether the fuse 132 has been inserted or withdrawn, and switches the controlled contents of the engine. That is, if the fuse 132 does not exist in the storage circuit 180, the controlled contents of the engine are maintained as the normal mode. If the fuse 132 is present in the storage circuit 180, the controlled contents of the engine are switched to the delivery mode. The controlled contents of the engine in the normal mode and in the delivery mode are the same as in the first embodiment.

According to the control device 110 constructed in this way, the same advantages as the advantages of the first embodiment are obtained. In addition, the backup power supply 40 and radio-audio device 130 are electrically connected or disconnected by insertion or withdrawal of the fuse 132. Hence, a reliable decision can be made as to whether the backup power supply 40 is applied or not. This makes it possible to grasp the application of the backup power supply without providing a separate connector. Consequently, the manufacturing cost can be curtailed further. In addition, the manufacturing cost can also be reduced effectively, because the backup power-supply circuit 131 is constructed using the fuse box 170 equipped in the vehicle.

Since the fuse 132 in storage within the storage circuit 180 is detected, if the fuse 132 is withdrawn from the backup power-supply circuit 131, it can be reliably judged. Furthermore, if the fuse breaks simply, a misrecognition that the fuse 132 has been withdrawn can be prevented; otherwise, the vehicle would shift to the delivery mode.

Moreover, the radio-audio device 130 is not electrically connected with the control apparatus 110. Therefore, noise produced in the control apparatus 110 is not entered into the radio-audio device 130. Hence, it is unlikely that the sensitivity of the radio receiver deteriorates or that the audio quality is deteriorated by noise.

Figure 6:
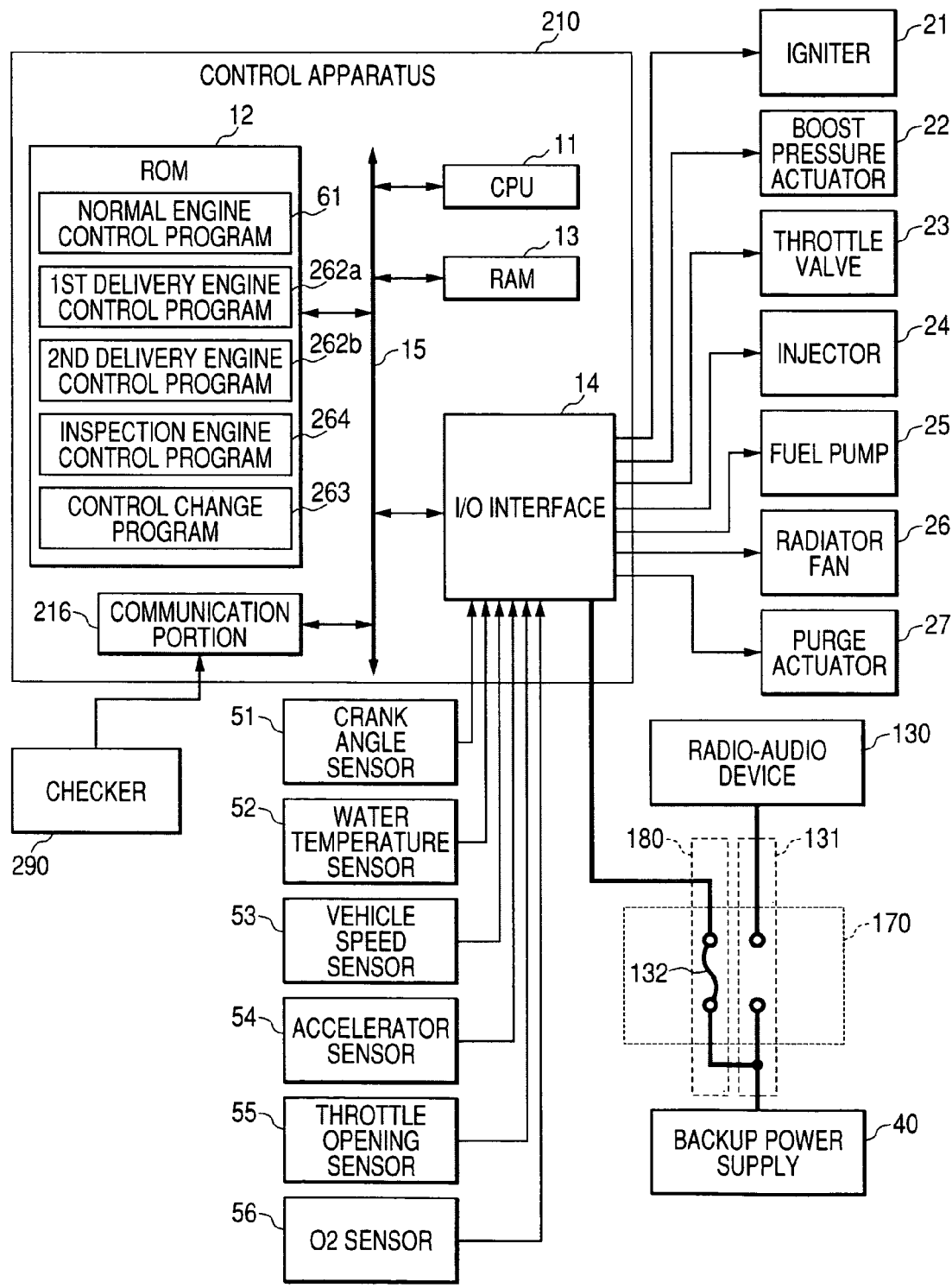
FIG. 6 is a schematic block diagram of a control apparatus showing a third embodiment of the invention.

FIG. 6 is a schematic block diagram of a control apparatus for a vehicle equipment device showing the configuration of a third embodiment of the present invention.

As shown in FIG. 6, the control apparatus 210 of the third embodiment is similar in configuration with the control apparatus 110 of the second embodiment except that a communication portion 216 for receiving an instruction signal regarding control of the engine is mounted and that the controlled contents of the engine are changed based on the instruction signal received by the communication portion 216. The following description centers on the differences with the second embodiment.

In the present embodiment, the communication portion 216 receives an instruction signal sent from a checker 290 connected on a delivery inspection line in a plant.

A first delivery engine control program 262a, a second delivery engine control program 262b, and an inspection engine control program 264 are stored in the ROM 12, in addition to a normal engine control program 61 identical with the normal engine control program 61 used in the second embodiment.

The second delivery engine control program 262b is similar in controlled content with the delivery engine control program 62 in the first and second embodiments. The controlled contents of the first delivery engine control program 262a are the same as the controlled contents of the second delivery engine control program excluding low-pressure operation regarding supply of boost pressure into the engine. That is, in the first delivery engine control program 262a, the boost pressure actuator 22 is driven in the same way as in the normal operation. The supercharger operates in the same way as in the normal mode.

The inspection engine control program 264 is used to control the engine in the inspection mode adapted for inspection, for example, in an automotive store. In the present embodiment, the operation of the boost pressure actuator 22 is checked. The boost pressure actuator 22 is turned on and off repeatedly irrespective of the state of operation of the engine. Also, the operation of the purge actuator 27 is checked. The actuator 27 is turned on and off repeatedly regardless of the state of operation of the engine.

When an instruction signal is received by the communication portion 216 and the vehicle is judged to be in the delivery mode, the control change program 263 changes the controlled contents of the engine to the first delivery mode. When the communication portion 216 receives an instruction signal and the vehicle is judged not to be in the delivery mode, the control change program 263 changes the controlled contents of the engine to the inspection mode. When the communication portion 216 receives no instruction signal and the vehicle is judged to be in the delivery mode, the control change program 263 changes the controlled contents of the engine to the second delivery mode. When the communication portion 216 receives no instruction signal and the vehicle is judged not to be in the delivery mode, the control change program 263 retains the controlled contents of the engine as the normal mode.

With the control apparatus 210 constructed in this way, the vehicle is judged to be in the delivery mode until the fuse 132 is inserted into the backup power-supply circuit 131 from the storage circuit 180 in an automotive store after the vehicle undergoes an assembly sequence in a plant, is delivered from the plant, and is transported to the store. During this time interval, the engine is controlled in the first delivery mode in principle. In the delivery inspection in the plant, the checker 290 is connected. When an instruction signal is received, the engine is controlled in the second delivery mode.

After the fuse 132 has been inserted into the backup power-supply circuit 131, the engine is controlled in the normal mode in principle. The checker 290 is connected in the store. When an instruction signal is received, the engine is controlled in the inspection mode.

In this way, according to the control apparatus 210 of the present embodiment, the advantages of the second embodiment are obtained. In addition, the controlled contents in the delivery mode are made different according to whether an instruction signal has been received or not by the communication portion 216. The controlled contents used during delivery inspection in a plant are made different from the controlled contents used during transportation to a store after delivery from the plant, by making different the two kinds of controlled contents in the delivery mode as described above. The controlled contents used when the vehicle is subjected to a delivery inspection are made different from the controlled contents used during transportation. Control can be provided according to the contents of the delivery inspection work of the vehicle.

When the vehicle is transported for a long time to a store after delivery from a plant, the vehicle is placed in the delivery mode. During inspection in the store, the vehicle is placed in the inspection mode. This makes the controlled contents used when the vehicle is inspected different from the controlled contents used in the delivery mode. Control can be performed according to the contents of the inspection work of the vehicle. In the present embodiment, the boost pressure actuator 22 and purge actuator 27 are turned on and off repeatedly and so these can be inspected.

In the first through third embodiments, the controlled contents of the engine are changed. The vehicle equipment device for which the controlled contents are changed by the control apparatus may be a transmission or differential, for example.

Furthermore, in the first through third embodiments, cited examples of the devices associated with functions independent of the running related functions are the clock device 30 and radio-audio device 130. They may also be a navigational system and a TV receiver. In addition, a device which does not relate to functions independent of the running related functions and which does not hinder the running of the vehicle can make a decision as to whether the vehicle is in the delivery mode or not according to whether the backup power supply is applied or not.

Further, in the third embodiment, the engine is controlled in any one of different delivery modes according to whether an instruction signal is received by the communication portion 216. The vehicle may be shifted to the delivery mode provided that an instruction signal is received or not. That is, when the communication portion 216 receives an instruction signal and the vehicle is judged to be in the delivery mode, the control change program 263 may change the controlled contents of the engine to the delivery mode. In this case, the controlled contents are not shifted to the delivery mode unless the communication portion 216 receives an instruction signal. Therefore, if a malfunction occurs during normal running of the vehicle, shifting to the delivery mode can be prevented certainly.

Additionally, in the third embodiment, the checker 290 is connected with the communication portion 216 by a wire, and an instruction signal is sent. An instruction signal may also be sent wirelessly from an external wireless device.

Further, in the second and third embodiments, the storage circuit 180 for receiving and holding the fuse 132 is mounted. A decision may be made as to whether the fuse 132 has been inserted or withdrawn by directly detecting whether the backup power-supply circuit 31 is energized or not as in the first embodiment.

Also, in the second and third embodiments, a decision may be made as to whether the vehicle is in the delivery mode or not depending on whether the backup power supply 40 is applied to the control apparatus 110 or 210 itself not depending on whether the backup power supply 40 is applied to the radio-audio device 130.

In addition, the controlled contents such as delivery mode and inspection mode can be modified arbitrarily according to the state of transportation or the contents of inspection. Besides, specific structure details can be appropriately modified, as a matter of course.

What is claimed is:

1. A control apparatus for a vehicle equipment device, said control apparatus comprising:
    delivery decision means for making a decision as to whether a vehicle is in a delivery mode or not;
    control change means for changing controlled contents of said vehicle equipment device from a normal mode to the delivery mode if the decision made by said delivery decision means is that the vehicle is in the delivery mode; and
    communication means for receiving an instruction signal regarding control of said vehicle equipment device from the outside;
    wherein said delivery decision means makes said decision according to whether a backup power supply is applied to an in-vehicle electronic device, and
    wherein said control change means changes controlled contents of said vehicle equipment device based on an instruction signal received by said communication means.

2. The control apparatus as set forth in claim 1, wherein said in-vehicle electronic device relates to functions independent of running related functions of the vehicle.

3. The control apparatus as set forth in claim 1, wherein said delivery decision means makes the decision as to whether said backup power supply is applied or not, depending on whether a fuse disposed in a circuit of said backup power supply has been inserted or withdrawn.

4. The control apparatus as set forth in claim 3, wherein there is further provided a storage circuit for receiving and holding said fuse withdrawn from the circuit of said backup power supply, and wherein said delivery decision means detects said fuse in said storage circuit to thereby make a decision as to whether the fuse has been inserted in or withdrawn from the circuit of said backup power supply.

5. The control apparatus as set forth in claim 1, wherein said control change means changes the controlled contents of said vehicle equipment device to said delivery mode if said communication means receives the instruction signal and if said delivery decision means determines that the vehicle is in the delivery mode.

6. The control apparatus as set forth in claim 1, wherein said control change means changes the controlled contents of said vehicle equipment device to an inspection mode, if said communication means receives the instruction signal and said delivery decision means determines that the vehicle is not in the delivery mode.

7. The control apparatus as set forth in claim 1, wherein said control change means is so designed that controlled contents in the delivery mode when the communication means has received an instruction signal and said delivery decision means has determined that the vehicle is in the delivery mode are made different from controlled contents in the delivery mode when the communication means has received no instruction signal and the delivery decision means has determined that the vehicle is in the delivery mode.

8. A control apparatus for a vehicle equipment device, said control apparatus being supplied with electric power from a backup power supply, said control apparatus comprising:
    delivery decision means for making a decision as to whether a vehicle is in a delivery mode or not;
    control change means for changing controlled contents of said vehicle equipment device from a normal mode to the delivery mode if the decision made by said delivery decision means is that the vehicle is in the delivery mode; and communication means for receiving an instruction signal regarding control of said vehicle equipment device from the outside;

wherein said delivery decision means makes said decision according to whether said backup power supply is applied or not, and wherein said control change means changes controlled contents of said vehicle equipment device based on an instruction signal received by said communication means.

9. The control apparatus as set forth in claim 8, wherein said control change means changes the controlled contents of said vehicle equipment device to said delivery mode if said communication means receives the instruction signal and if said delivery decision means determines that the vehicle is in the delivery mode.

10. The control apparatus as set forth in claim 8, wherein said control change means changes the controlled contents of said vehicle equipment device to an inspection mode, if said communication means receives the instruction signal and said delivery decision means determines that the vehicle is not in the delivery mode.

11. The control apparatus as set forth in claim 8, wherein said control change means is so designed that controlled contents in the delivery mode when the communication means has received an instruction signal and said delivery decision means has determined that the vehicle is in the delivery mode are made different from controlled contents in the delivery mode when the communication means has received no instruction signal and the delivery decision means has determined that the vehicle is in the delivery mode.

* * * * *